US008877108B2

(12) United States Patent
Tutmark

(10) Patent No.: US 8,877,108 B2
(45) Date of Patent: Nov. 4, 2014

(54) SYSTEM AND METHOD FOR MAKING A GOLF BALL HAVING A PATTERNED SURFACE

(75) Inventor: Bradley C. Tutmark, Aloha, OR (US)

(73) Assignee: Nike, Inc., Beaverton, OR (US)

(*) Notice: Subject to any disclaimer, the term of this patent is extended or adjusted under 35 U.S.C. 154(b) by 333 days.

(21) Appl. No.: 13/340,501

(22) Filed: Dec. 29, 2011

(65) Prior Publication Data
US 2013/0168896 A1 Jul. 4, 2013

(51) Int. Cl.
B29C 33/40 (2006.01)

(52) U.S. Cl.
USPC ........... 264/219; 264/220; 264/221; 264/222; 264/223; 264/224; 264/225; 264/226; 264/227; 264/36.12

(58) Field of Classification Search
USPC ................ 264/219, 36.12, 220–227
See application file for complete search history.

(56) References Cited

U.S. PATENT DOCUMENTS

| | | |
|---|---|---|
| 2,861,810 A | 11/1958 | Veatch |
| 3,543,380 A | 12/1970 | Hagopian |
| 3,831,423 A | 8/1974 | Brown et al. |
| 4,552,004 A | 11/1985 | Barfield et al. |
| 4,998,734 A | 3/1991 | Meyer |
| 5,165,965 A | 11/1992 | Martin |
| 5,542,680 A | 8/1996 | Proudfit et al. |
| 5,997,418 A | 12/1999 | Tavares et al. |
| 6,375,783 B1 | 4/2002 | Davis |
| 6,558,277 B1 | 5/2003 | Ohira et al. |
| 7,303,492 B2 | 12/2007 | Aoyama et al. |
| 7,306,529 B2 | 12/2007 | Kennedy, III et al. |
| 7,618,332 B2 | 11/2009 | Sato et al. |
| 7,618,333 B2 | 11/2009 | Nardacci et al. |
| 7,625,303 B2 | 12/2009 | Simonds et al. |
| 2002/0037335 A1 | 3/2002 | Ogg et al. |
| 2003/0001309 A1 | 1/2003 | Murphy |
| 2003/0102595 A1* | 6/2003 | Puniello et al. ............... 264/219 |
| 2004/0152541 A1* | 8/2004 | Sajima ......................... 473/378 |
| 2005/0250604 A1 | 11/2005 | Kasashima et al. |
| 2007/0149319 A1 | 6/2007 | Ohira |
| 2008/0261725 A1* | 10/2008 | Olson et al. .................. 473/384 |
| 2010/0323055 A1 | 12/2010 | Inoue et al. |

FOREIGN PATENT DOCUMENTS

WO  WO0062996 A1  10/2000

OTHER PUBLICATIONS

International Search Report and the Written Opinion of the International Searching Authority in connection with International Patent Application No. PCT/US2012/070796 mailed on May 30, 2013; 16 pages.

* cited by examiner

Primary Examiner — Jeffrey Wollschlager
Assistant Examiner — Stella Yi
(74) Attorney, Agent, or Firm — Quinn Law Group, PLLC.

(57) ABSTRACT

A system and method for making a golf ball having a patterned surface is disclosed. The pattern may be made by a method including machining a pattern of feed marks on the surface of a golf ball mold and using the golf ball mold to mold a golf ball cover layer. The pattern may be configured to create capillary action to substantially counteract gravity and/or other forces acting on a substantially liquid coating material applied to the cover layer of the golf ball.

20 Claims, 10 Drawing Sheets

EXEMPLARY EMBODIMENT OF METHOD OF MAKING A GOLF BALL MOLD

SYSTEM AND METHOD FOR MAKING A GOLF BALL HAVING A PATTERNED SURFACE

BACKGROUND

The present invention relates generally to a system and method for manufacturing a golf ball. In particular, the system and method relates to manufacturing a golf ball mold and using the mold to manufacture a golf ball.

The game of golf is an increasingly popular sport at both amateur and professional levels. A wide range of technologies related to the manufacture and design of golf balls are known in the art. For instance, a method of manufacturing golf balls involves spraying golf balls with coating material. This method achieves an even coating on the surface of the golf ball. However, as the coating dries, the coating often settles unevenly on the surface of the golf ball. It would be advantageous to be able to make a coating settle evenly on a golf ball after the coating has been applied.

SUMMARY

A system and method for making a golf ball having a patterned surface is disclosed. The pattern may be made by a method including machining a pattern of feed marks on the surface of a golf ball mold and using the golf ball mold to mold a golf ball cover layer. The pattern may be configured to create capillary action to substantially counteract gravity and/or other forces acting on a substantially liquid coating material applied to the cover layer of the golf ball.

In one aspect, the disclosure provides a method of making a golf ball. The method may include selecting a pattern of feed marks to be formed on the surface of a golf ball mold. The step of selecting the pattern of feed marks may be performed by a user. The method may include machining the selected pattern of feed marks on the surface of the golf ball mold, placing a core within the golf ball mold, and injecting golf ball cover material into the golf ball mold. The selected pattern may include a first set of rows of substantially parallel feed marks and a second set of rows of substantially parallel feed marks intersecting the first set of rows. The first set of rows may include substantially parallel rows and the second set of rows includes substantially parallel rows. The first set of rows may be substantially perpendicular to the second set of rows. The selected pattern may include a set of feed marks forming a spiral pattern.

In one aspect, the disclosure provides a method of making a golf ball mold. The method may include selecting a pattern of feed marks to be formed on the surface of a golf ball mold. The step of selecting the pattern of feed marks may be performed by a user. The method may include selecting a path for a cutting device to follow to form the selected pattern of feed marks and forming the selected pattern of feed marks on the surface of the golf ball mold. The cutting device may include a milling tool. The cutting device may include a laser cutter. The selected pattern of feed marks may include a pattern of perpendicular sets of rows. The step of selecting a path for the cutting device to follow may be performed by a computer. The step of forming the selected pattern may include moving the cutting tool in the selected path.

In one aspect, the disclosure provides a golf ball may have a core and a cover layer surrounding the core. The cover layer may include a cover layer surface having dimples. The cover layer surface may include feed marks forming a pattern. The pattern may include a first set of rows of substantially parallel feed marks and a second set of rows of substantially parallel feed marks intersecting the first set of rows. The first set of rows may include substantially parallel rows and the second set of rows may include substantially parallel rows. The first set of rows may be substantially perpendicular to the second set of rows. The pattern may include a set of feed marks forming a spiral pattern. The pattern may be configured to create capillary action to substantially counteract gravity and/or other forces acting on a substantially liquid coating material applied to the cover layer.

In one aspect, the disclosure provides a golf ball mold may have at least one mold chamber including a mold surface having a shape that is the inverse of a substantially hemispherical shape. The mold surface may include protrusions and feed marks forming a pattern. The golf ball mold may include gates providing a path for a cover material to be injected into the at least one mold chamber. The golf ball mold may include ports providing a path for the cover material to be injected into the gates. The pattern may include a first set of rows of substantially parallel feed marks and a second set of rows of substantially parallel feed marks intersecting the first set of rows. The first set of rows may include substantially parallel rows and the second set of rows may include substantially parallel rows. The first set of rows may be substantially perpendicular to the second set of rows. The pattern may include a set of feed marks forming a spiral pattern. The pattern may be formed only on the area located between the protrusions. The pattern may be formed on the protrusions. The pattern may be configured to create capillary action to substantially counteract gravity and/or other forces acting on a substantially liquid coating material applied to the cover layer of a golf ball formed by the golf ball mold.

In one aspect, the disclosure provides a method of making a golf ball mold may include machining at least two mold chambers each having a shape that is the inverse of a substantially hemispherical shape. The method may include machining protrusions on a surface of the two mold chambers. The method may include machining a pattern of feed marks on the surface of the mold chamber. The pattern may include a first set of rows of substantially parallel feed marks and a second set of rows of substantially parallel feed marks intersecting the first set of rows. The first set of rows may include substantially parallel rows and the second set of rows may include substantially parallel rows. The first set of rows is substantially perpendicular to the second set of rows. The pattern may include a set of feed marks forming a spiral pattern. The pattern may be configured to create capillary action to substantially counteract gravity and/or other forces acting on a substantially liquid coating material applied to the cover layer.

In one aspect, the disclosure provides a method of making a golf ball may include providing a golf ball mold having at least two mold chambers. The mold chambers may each include a mold surface having a shape that is the inverse of a substantially hemispherical shape. Each of the mold surfaces may have protrusions and feed marks forming a pattern. The method may include forming a golf ball core. The method may include placing the golf ball core between the at least two mold chambers. The method may include pressing the at least two mold chambers together. The method may include injecting a golf ball cover material into the mold chambers. Injecting the golf ball the cover material into the mold chambers may include injecting the golf ball cover material into ports and gates of the golf ball mold. The pattern of feed marks may include a first set of rows of substantially parallel feed marks and a second set of rows of substantially parallel feed marks intersecting the first set of rows. The pattern may include a set of feed marks forming a spiral pattern. The pattern may be configured to create capillary action to substantially counteract gravity and/or other forces acting on a substantially liquid coating material applied to the cover layer of a golf ball formed by the golf ball mold.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A system and method for manufacturing a golf ball is disclosed. The system and method may involve a method of making a golf ball mold with a patterned surface.

Golf balls typically include a core substantially surrounded by one or more layers. For example, a golf ball may be of a two-piece construction, having only a core and a cover layer, or a golf ball may have one or more intermediate layers located between the core and the cover layer. Golf balls within the scope of this disclosure may be of a two-piece construction, or may have additional intermediate layers between the core and cover layer. The disclosed method may be used to form golf balls of all types.

Figure 1:
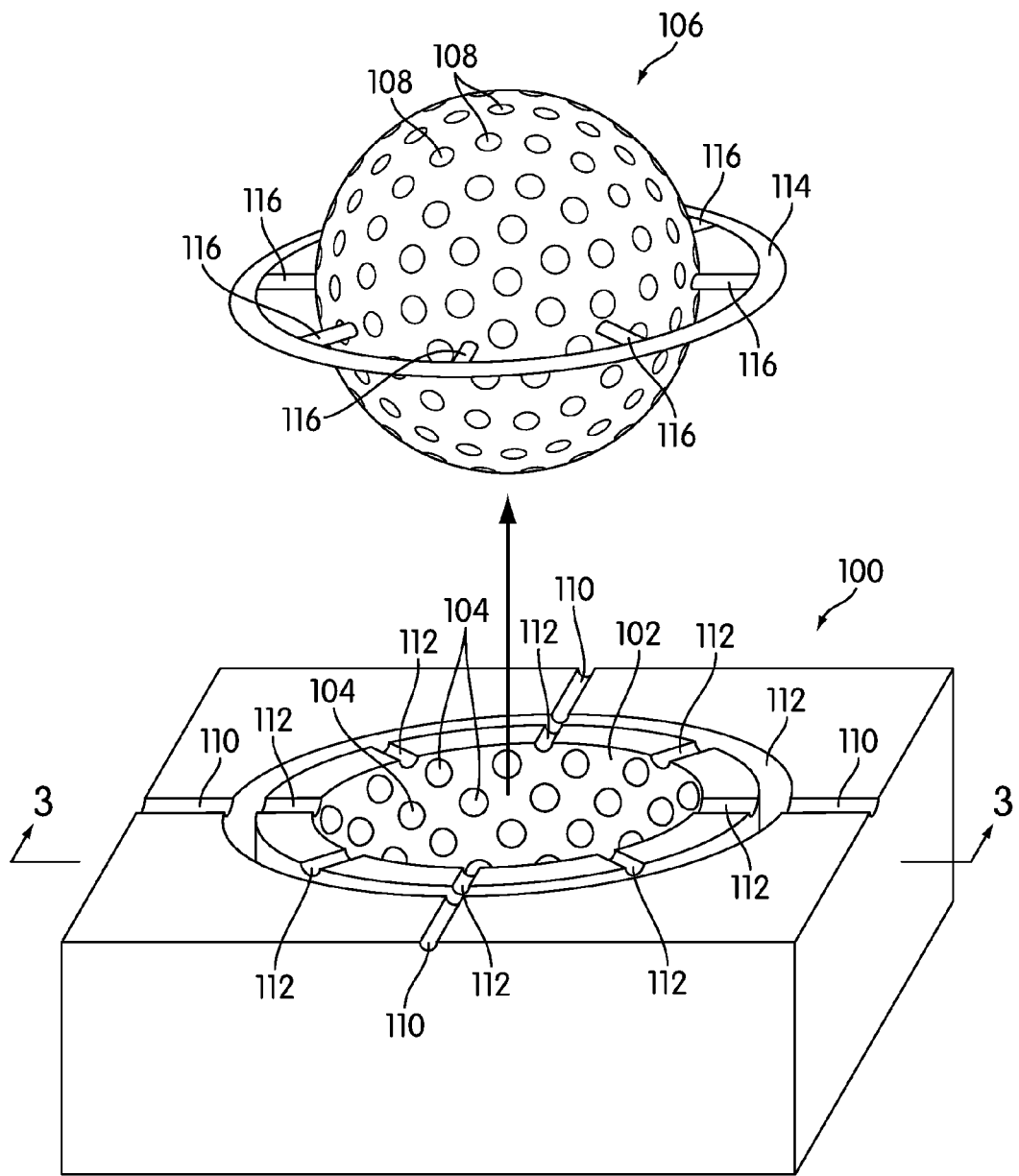
FIG. 1 is a prior art golf ball mold and a golf ball formed by the prior art golf ball mold.

The cover layer of golf balls may be created by injection molding cover layer material around the core. The cover layer material may include a polymer, such as a thermoplastic, elastomeric, or thermosetting material. FIG. 1 shows a golf ball mold half 100 having a mold chamber 102, ports 110, and gates 112. Ports 110 and gates 112 may provide a fluid path from a source of cover layer material to mold chamber 102. Mold chamber 102 may have an inverse hemispherical shape corresponding to the general shape of half of a golf ball. Multiple protrusions 104 may be dispersed about the surface of mold chamber 102. Protrusions 104 of mold chamber 102 may correspond to dimples formed on the cover layer of golf balls. In some embodiments, a golf ball cover layer may be formed by placing a golf ball core between multiple golf ball molds. For example, a core may be placed between mold half 100 and a second mold half shaped to compliment mold half 100. The second mold half may have a mold chamber, ports, and gates complimentary to mold chamber 102, ports 110, and gates 112, respectively. Mold half 100 and the second mold half may be pressed together to enclose the core within mold chambers and to align the ports and gates. Cover layer material may be injected into one or more of ports 110. The cover layer material may flow from ports to the mold chambers via one or more of gates 112. The cover layer material may fill the space between the core and mold chamber 102. As the material cools, it may set and form a cover layer around the core. While FIG. 1 shows four ports 110 and eight gates 112, the number of ports and/or gates may vary. The number of ports and/or gates may be selected based on a variety of factors. For example, the number of ports and/or gates may be selected based on the temperature of the mold halves, the material used in the injection molding process, or the dimensions of the mold halves.

Figure 2:
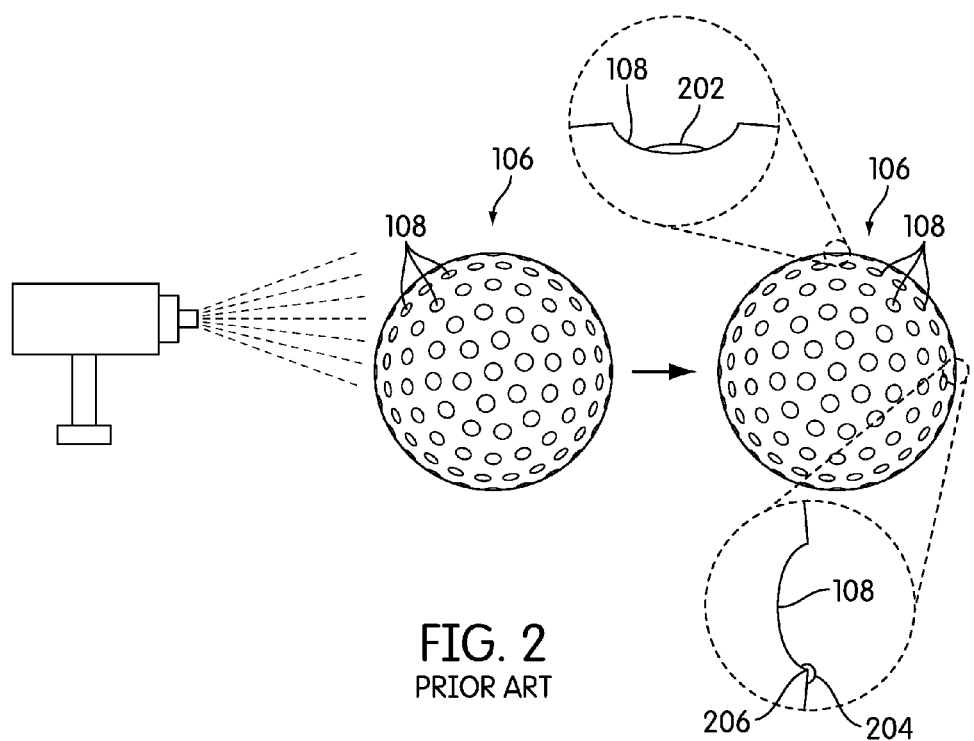
FIG. 2 is the golf ball of FIG. 1 being sprayed with coating material and a zoomed in view of deposits of coating material forming on the golf ball.
Figure 3:
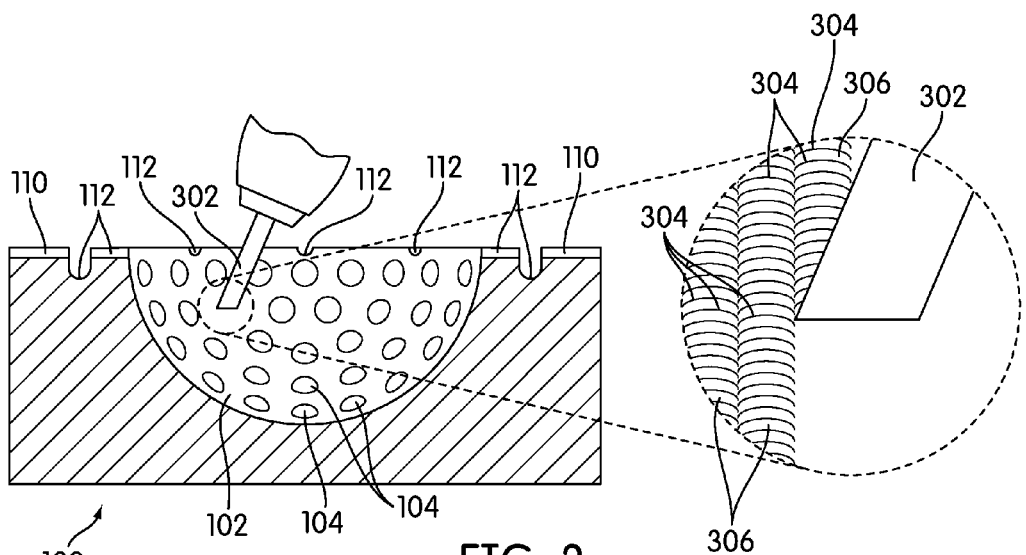
FIG. 3 is the golf ball mold of FIG. 1 being machined and a zoomed in view of the feed marks left behind from machining.

FIG. 1 shows a golf ball 106 as it appears after mold 100 is used to mold a cover layer around a core. Dimples 108 on golf ball 106 may correspond with protrusions 104 of mold chamber 102. Golf ball 106 may include a ring 114 and rods 116. Ring 114 and rods 116 may be a byproduct formed by gates 116 during the molding process. After the cover layer is molded, ring 114 and rods 116 may be removed from golf ball 106. Golf ball 106 may then undergo finishing work. For example, as shown in FIG. 2, golf ball 106 may be sprayed with a protective coating or a coating that imparts aerodynamic properties to golf ball 106. These coating materials may be substantially liquid when they are applied to the ball. Ball 106 may be stationary or may be spinning before, during, and/or after the coating material is applied to ball 106. As the coating material dries, gravity and/or other forces acting on golf ball 106 may cause the coating material to settle unevenly on the surface of golf ball 106. For example, as shown in FIG. 3, the coating material may puddle and form a deposit 202 in the bottom of dimple 108. Similarly, the coating material may collect and form a deposit 204 at the edge 206 of dimple 108. Deposit 206 may give a portion of dimple 108 a rounded edge. These deposits, or buildup of coating material, may result in an uneven coating on the outer surface of the golf ball. Such deposits may interfere with the aerodynamic properties of the golf ball.

The deposits of coating material may be caused by the outer surface of the cover layer being too smooth and uniform for the coating material to stick. In other words, the roughness or friction of the surface of the cover layer may be too low to counteract the gravity and/or other forces that may be acting on the coating material as the coating material dries. The smooth surface of the cover layer of golf ball 106 may be caused by mold chamber 102 having a smooth surface. The process used to form mold half 100 may cause mold chamber 102 to have a smooth surface. Golf ball molds may be made through machining processes, such as stamping, hobbing, and traditional machining and laser machining with 5-axis machines. Traditional machining processes may include using a tool to shape the mold surface by removing material from a workpiece. Laser machining processes may include using a focused laser beam to shape the mold surface by removing material from a workpiece. Traditional machining and laser machining may leave behind subtle feed marks as the tool or laser cuts away material on a workpiece. FIG. 3 shows an example of feed marks left behind by a tool 302 during traditional machining. Tool 302 may remove material by rotating. During rotation, the cutting end of tool 302 may leave feed marks including substantially curved, fine lines 304. As tool 302 rotates, tool 302 may also move through a straight path along the surface of mold chamber 102. This linear motion may leave a series of substantially parallel, curved lines 304 forming substantially uniform rows 306 of feed marks in the wake of tool 302. Laser machining may leave behind similar marks as the laser cuts away material on a workpiece. The feed marks resulting from traditional and laser machining processes may be so subtle and uniform that the roughness of the surface of mold may be extremely low such that the surface appears to be polished. When the cover layer of golf ball 106 is molded from a mold having such a smooth surface, the surface of the cover layer may have the same low roughness and uniformity. Once the cover layer is coated with coating material, gravity and/or other forces acting on golf ball 106 may cause the wet coating material to shift and settle into deposits as the coating material dries.

In some embodiments, in place of or in addition to travelling through the path shown in FIG. 3, a tool or laser may move through a spiral path along the surface of mold chamber 102 from a point on the top edge of mold chamber 102 to the bottommost point, or pole, of mold chamber 102. In such embodiments, the tool or laser may leave behind feed marks in the shape of a spiral.

Figure 4:
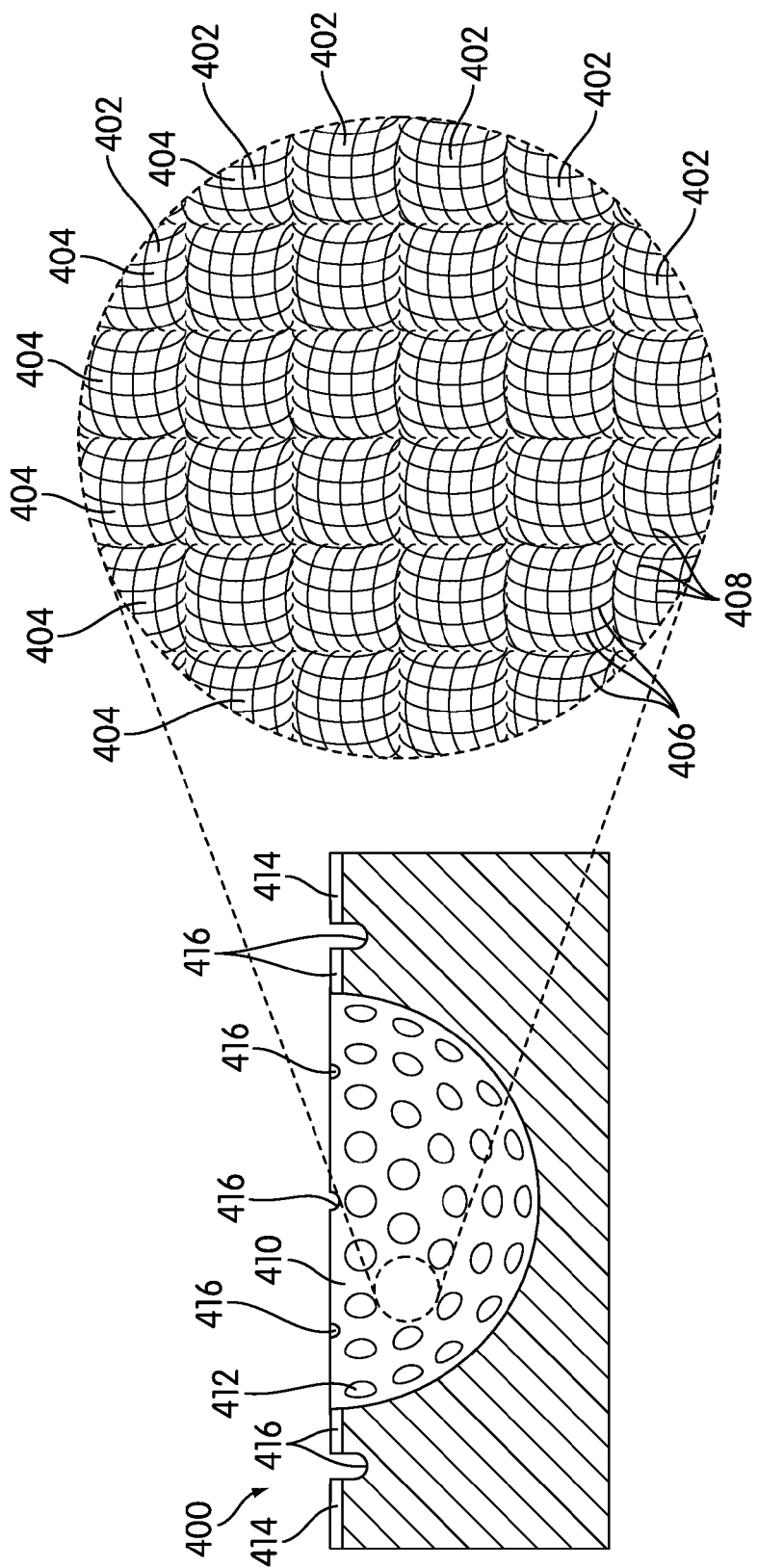
FIG. 4 is a golf ball mold and a zoomed in view of a pattern of feed marks formed on the surface of the golf ball mold according to an embodiment.

The disclosed method may prevent the coating material from collecting in certain areas as the coating material dries. To help the coating material stick to the cover layer after application, the surface roughness of the cover layer may be increased. This increase in roughness may be accomplished by increasing the surface roughness of the mold chamber used to make the cover layer. The machining process may be manipulated to increase the surface roughness of a mold chamber by deliberately forming feed marks in a pattern. This process differs from machining a depression or protrusion in mold chamber 410 because this process involves strategically placing the feed marks, which removes less material. The feed marks may be sufficiently subtle to prevent interference with the aerodynamic properties of a golf ball. In addition to increasing roughness, the pattern may be selected to take advantage of capillary action provided by the narrow and shallow feed marks. For example, in the embodiment shown in FIG. 4, the pattern may include intersecting rows of substantially curved, fine lines creating a crisscross pattern. FIG. 4 shows a mold half 400 having a mold chamber 410 including protrusions 412 corresponding to dimples. As shown in the zoomed in view of a portion of mold chamber 410, the surface of mold chamber 410 may include a first set of lines 406 including multiple curved lines that curve in substantially the same direction. First set of lines 406 may form substantially uniform rows 402 of substantially parallel feed marks. Rows 402 may be substantially parallel to one another. Rows 402 may be spaced apart from each other within standard manufacturing tolerances. In some embodiments, rows 402 may overlap with each other.

A second set of lines 408 may include lines substantially similar to first set of lines 406. For example, second set of lines 408 may include multiple curved lines that may be substantially parallel to one another. In some embodiments, second set of lines 408 may intersect with first set of lines 406. In some embodiments, second set of lines 408 may form substantially uniform rows 404 of feed marks. In some embodiments, rows 402 may be spaced apart from each other within standard manufacturing tolerances. In some embodiments, rows 404 may overlap with each other. In some embodiments, rows 402 may intersect with rows 404. In some embodiments, rows 402 may be substantially perpendicular to rows 404. In some embodiments, rows 402 may intersect rows 404 at an angle other than ninety degrees. For example, rows 402 may intersect rows 404 at a forty-five degree angle. In some embodiments, first set of lines 406 may intersect second set of lines 408 at an angle other than ninety degrees.

The lines making up first set of lines 406 and second set of lines 408 may be sufficiently narrow and shallow to create capillary action when coating material is applied to the cover layer of a golf ball molded by mold chamber 410. Consequently, the capillary action may substantially counteract gravity and/or other forces acting on the coating material. The coating material may stay where the coating material was applied without shifting elsewhere and forming deposits. The lines making up first set of lines 406 and second set of lines 408, or the lines of any embodiment, may have same depth as conventional tool marks. The lines making up first set of lines 406 and second set of lines 408, or the lines of any embodiment, may be sufficiently deep to add texture and roughness to the surface of cover layer. For example, the depth of the lines may range from about 0.00005 inches to about 0.005 inches. In some embodiments, the tolerances of depth of the lines may range from about 0.000025 inches to about 0.0025 inches. Friction provided by the roughness of the sets of lines may help the coating material stick to the surface of the cover layer.

Figure 5:
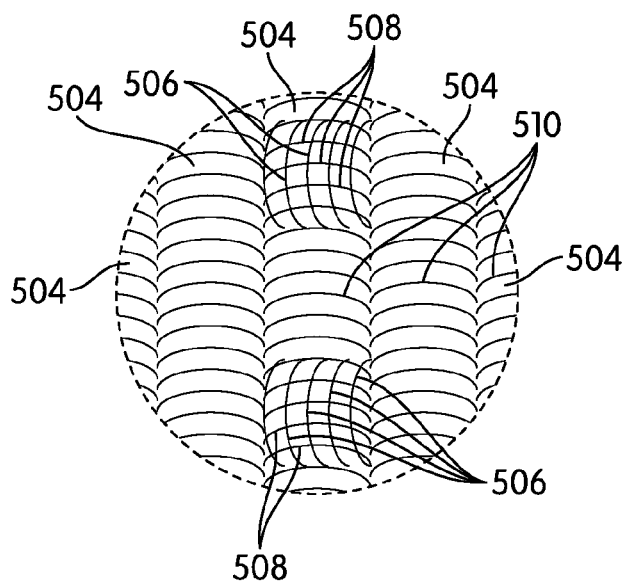
FIG. 5 a zoomed in view of a pattern of feed marks formed on the surface of a golf ball mold according to an embodiment.

In some embodiments, the crisscross pattern of feed marks may be included continuously on the surface of mold chamber 410. In some embodiments, the crisscross pattern may be positioned amongst another pattern. In some embodiments, the crisscross pattern may be selectively repeated amongst other patterns. For example, as shown in FIG. 5, the crisscross pattern created by lines 506 and 508 may be repeated in at least two locations amongst lines 510 forming substantially parallel rows 504. In some embodiments, the number and location of crisscross patterns may be selected based on a variety of factors. For example, the number and location of crisscross patterns may be selected based on the coating material to be used, the pattern of the dimples, and the cover layer material. In some embodiments, the crisscross pattern may be strategically placed in locations commonly having a lack of coating material. In some embodiments, the crisscross pattern of feed marks may be included continuously on protrusions 412 of mold chamber 410. In some embodiments, the pattern of feed marks may be selectively excluded from protrusions 412. For example, in some embodiments, the pattern of feed marks may be selectively excluded from a portion of protrusions 412. In another embodiment, the pattern of feed marks may be excluded from all protrusions 412.

Figure 6:
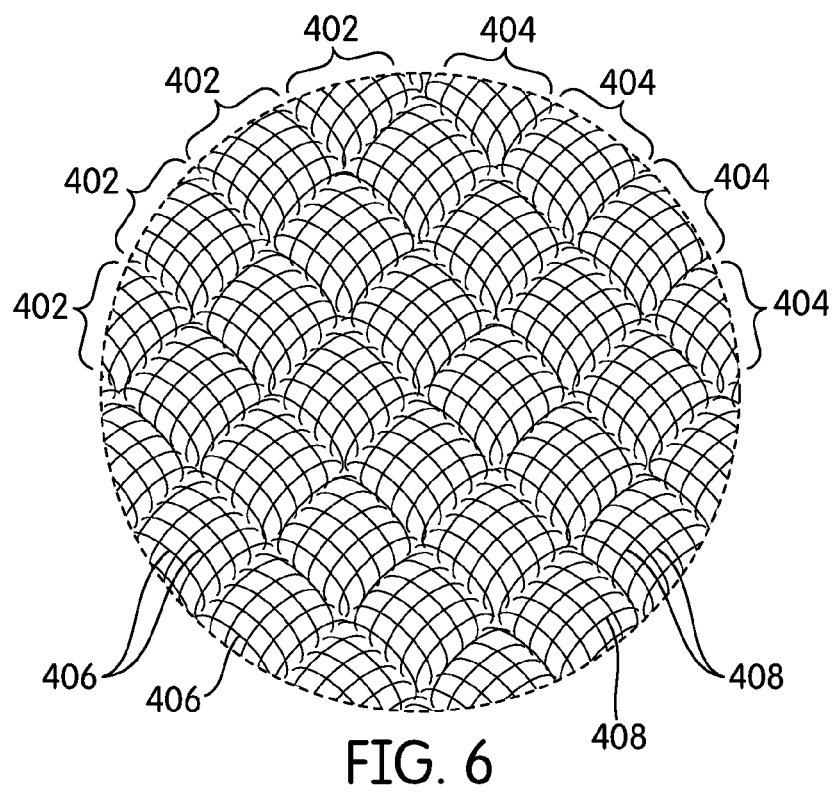
FIG. 6 is a zoomed in view of a pattern of feed marks formed on the surface of a golf ball mold according to an embodiment.

In some embodiments, the pattern of feed marks developed on the surface of the golf ball cover layer may be oriented in a predetermined position during application of a coating material. For example, in some embodiments, a golf ball having the pattern shown in FIG. 4 may by oriented as the pattern is shown in FIG. 4. In another embodiment, a golf ball having the pattern shown in FIG. 4 may be positioned so that the pattern is oriented as shown in FIG. 6. The orientation of the golf ball may be selected based on a variety of factors. For example, the orientation of the golf ball may be selected based on the viscosity of the coating material, the material of the cover layer, the depth of the feed marks, and/or the width of the feed marks.

Referring to FIG. 4, first set of lines 406 may be formed by moving a tool or laser through substantially parallel, side-by-side, linear paths. In some embodiments, the tool or laser may follow the paths consecutively. For example, once a linear path, or row 402, is complete, the tool or laser may begin a new, parallel path from a point directly adjacent the original starting point of the previous path. In some embodiments, the tool or laser may follow the linear paths creating rows 402 in a discontinuous order. For example, once a linear path is complete, the tool or laser may begin a new parallel path from a point spaced from the original starting point of the previous path such that the new parallel path is spaced from the previous path. In some embodiments, the paths may overlap so that rows 402 overlap. Second set of lines 408 may be formed in a manner similar to the manner in which first set of lines are formed. In some embodiments, second set of lines 408 may be formed by moving a machine tool or laser through substantially parallel, side-by-side, linear paths. In some embodiments, the paths may overlap so that rows 404 overlap. The paths may be followed consecutively or in a discontinuous order, as explained above in reference to first set of lines 406. In some embodiments, first set of lines may be completed before second set of lines 408. In some embodiments, second set of lines 408 may be completed before first set of lines. In some embodiments, a portion of first set of lines may be completed before a portion of second set of lines 408 are completed. In some embodiments, a portion of second set of lines 408 may be completed before a portion of first set of lines are completed. In some embodiments, rows 402 and rows 404 may be completed alternatively.

Figure 7:
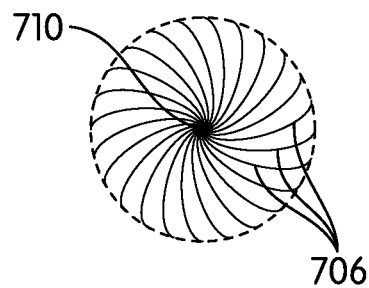
FIG. 7 is a zoomed in view of a pattern of feed marks formed on the surface of a golf ball mold according to an embodiment.
Figure 8:
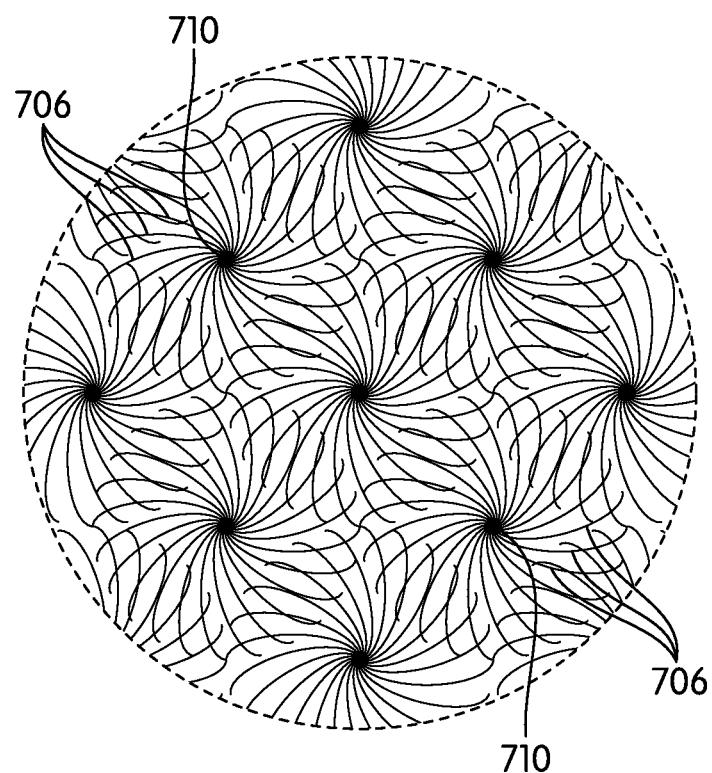
FIG. 8 is a zoomed in view of a pattern of feed marks formed on the surface of a golf ball mold according to an embodiment.
Figure 9:
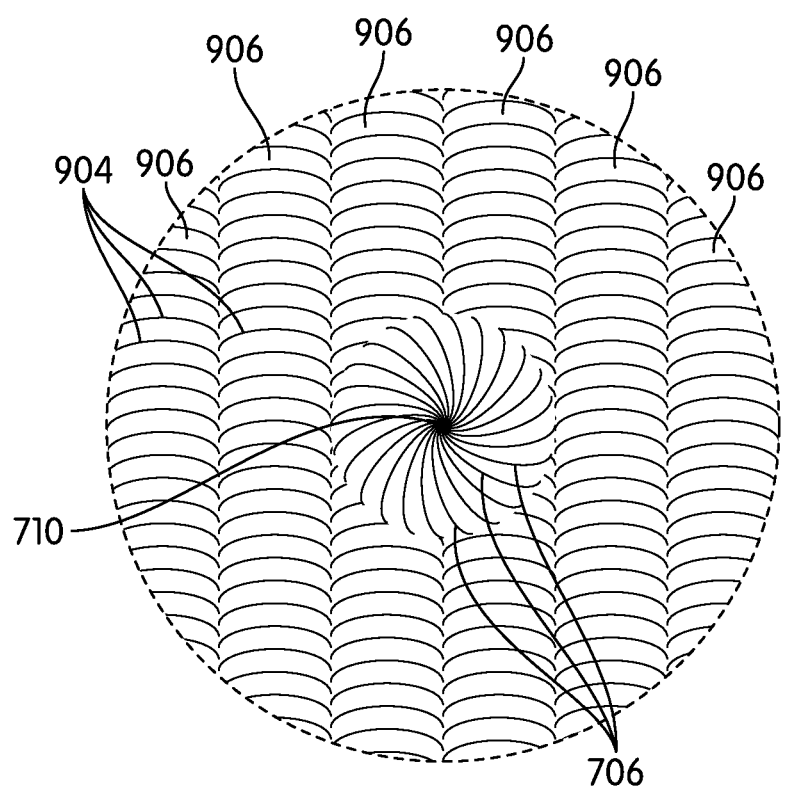
FIG. 9 is a zoomed in view of a pattern of feed marks formed on the surface of a golf ball mold according to an embodiment.

In some embodiments, the pattern of feed marks developed on the surface of the golf ball cover layer may form a substantially spiral pattern. For example, FIG. 7 shows an embodiment in which the feed marks include substantially curved, fine lines 706 forming a substantially spiral pattern. The spiral pattern may increase the roughness of the cover layer surface. Lines 706 may be sufficiently narrow and shallow to create capillary action when coating material is applied to the cover layer of a golf ball molded by a mold chamber with this spiral pattern. Accordingly, the capillary action may draw the coating material toward a center 710 of the spiral pattern. In some embodiments, the spiral pattern may be repeated on the mold chamber surface. In some embodiments, the spiral pattern created by lines 706 may be continuously repeated, as shown in FIG. 8. In some embodiments, the spiral pattern created by lines 706 may be positioned amongst other patterns of feed marks. For example, as shown in FIG. 9, the spiral pattern may be positioned amongst feed marks including a series of substantially parallel, curved lines 904 forming substantially uniform rows 906. In some embodiments, lines 706 may be formed over rows 906 and/or other patterns. In some embodiments, the spiral pattern may be selectively repeated amongst other patterns. In some embodiments, the number and location of spiral patterns may be selected based on a variety of factors. For example, the number and location of spiral patterns may be selected based on the coating material to be used, the pattern of the dimples, and the cover layer material. In some embodiments, the spiral patterns may be strategically placed in locations commonly lacking coating material.

Referring to FIGS. 7-9, lines 706 may be formed by moving a tool or laser through a circular path. In some embodiments, the tool or laser may follow paths developing other patterns around the spiral pattern. For example, the pattern in FIG. 9 may be achieved by moving a tool or laser through substantially parallel, side-by-side, linear paths to create rows 906. In some embodiments, the tool or laser may follow the paths consecutively. For example, once a linear path, or row 906, is complete, the tool or laser may begin a new, parallel path from a point directly adjacent the original starting point of the previous path. In some embodiments, the tool or laser may follow the linear paths creating rows 906 in a discontinuous order. For example, once a linear path is complete, the tool or laser may begin a new parallel path from a point spaced from the original starting point of the previous path such that the new parallel path is spaced from the previous path. In some embodiments, the tool may form rows 906 with a space in which lines 706 may be formed. In some embodiments, lines 706 may be formed over rows 906.

Figure 10:
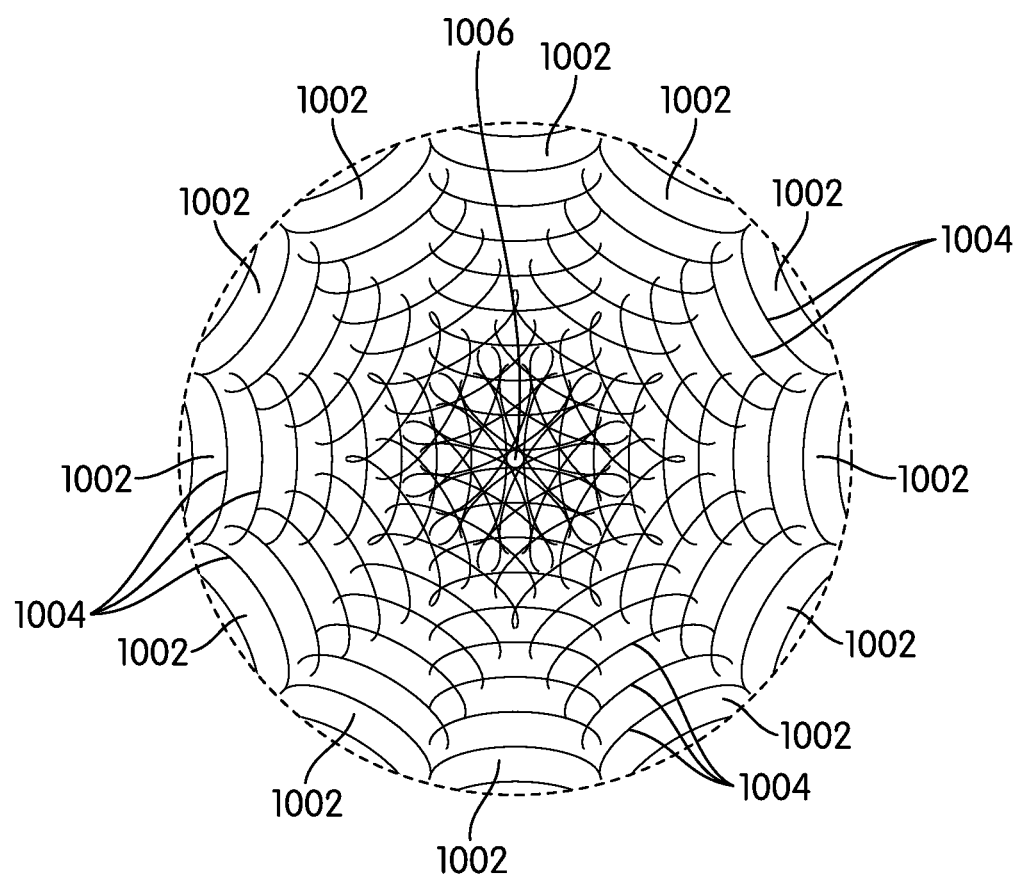
FIG. 10 is a zoomed in view of a pattern of feed marks formed on the surface of a golf ball mold according to an embodiment.

In some embodiments, the pattern of feed marks developed on the surface of the golf ball cover layer may form a substantially star-shaped pattern. For example, FIG. 10 shows an embodiment in which the feed marks include substantially curved, fine lines 1004 forming rows 1002. Rows 102 meet at a center 1006 of the star-shaped pattern. Rows 1002 may overlap as they approach center 1006. The star-shaped pattern may increase the roughness of the cover layer surface. Lines 1004 may be sufficiently narrow and shallow to create capillary action when coating material is applied to the cover layer of a golf ball molded by a mold chamber. Consequently, the capillary action may substantially counteract gravity and/or other forces acting on the coating material. The coating material may stay where the coating material was applied without shifting elsewhere and forming deposits. In some embodiments, the star-shaped pattern may be repeated on the mold chamber surface. In some embodiments, the star-shaped pattern created by lines 1004 may be continuously repeated, similar to the repetition of the spiral shaped pattern shown in FIG. 8. In some embodiments, the star-shaped pattern created by lines 1004 may be positioned amongst other patterns of feed marks similar to the spiral shaped pattern shown in FIG. 9.

Referring to FIG. 10, lines 1004 may be formed by moving a tool or laser through a paths radiating from center 1006. In some embodiments, the tool or laser may follow paths developing other patterns around the star-shaped pattern, as described with reference to the spiral pattern in FIG. 9 above.

Figure 11:
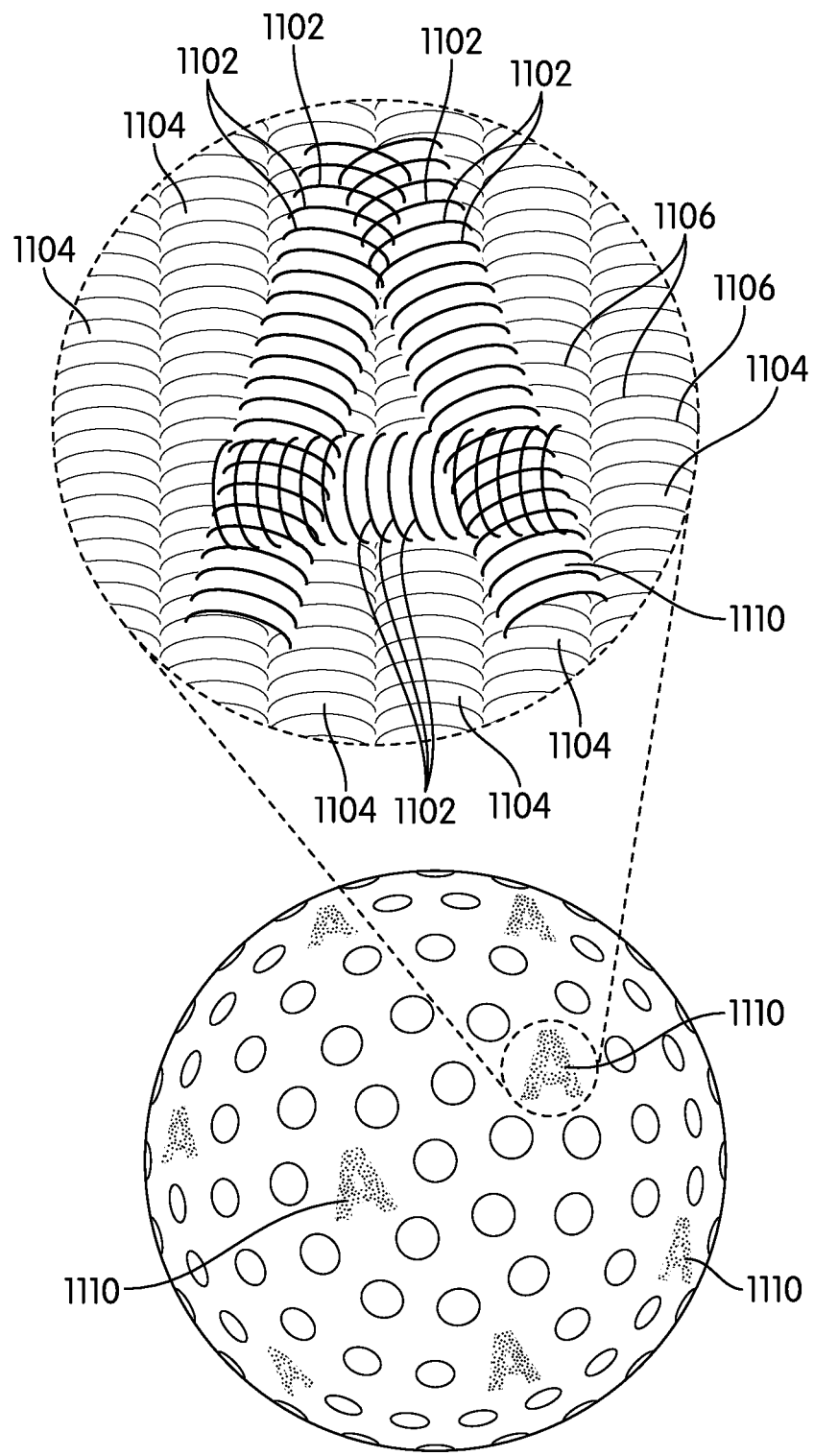
FIG. 11 is a golf ball and a zoomed in view of a pattern of feed marks formed on the surface of the golf ball according to an embodiment.
Figure 12:
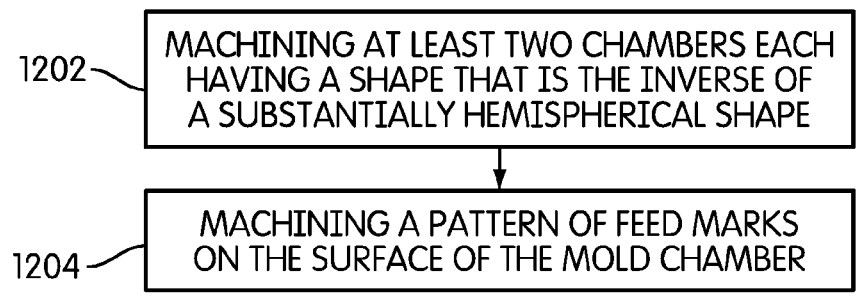
FIG. 12 is a method of making a golf ball mold according to an embodiment.
Figure 13:
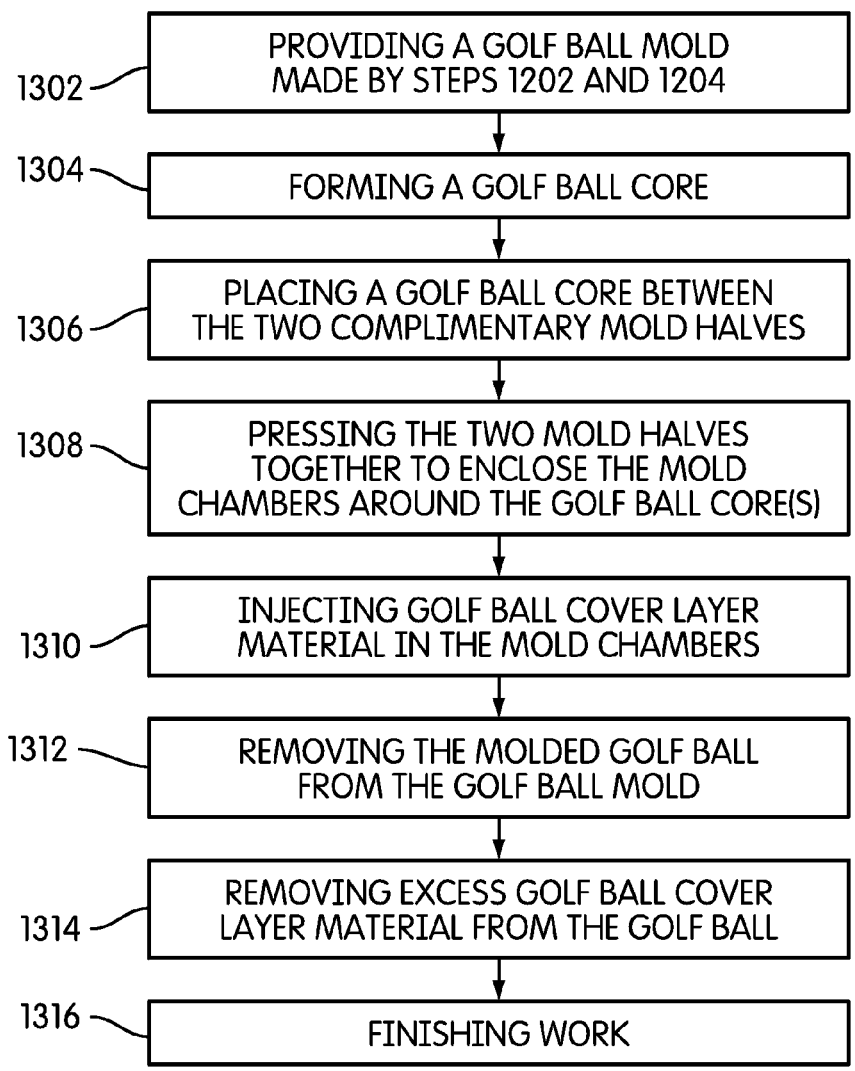
FIG. 13 is method of making a golf ball according to an embodiment.

In some embodiments, the pattern of feed marks may include a number, letter, symbol, or logo. For example, FIG. 11 shows an embodiment in which the feed marks include substantially curved, fine lines 1102 forming a letter 1110. The pattern of feed marks may cause light to reflect in different directions, thus making the pattern visibly noticeable. In some embodiments, letter 1110 may be a single letter positioned amongst another pattern. In some embodiments, letter 1110 may be selectively repeated amongst another pattern. In some embodiments, letter 1010 may be visible to the naked eye on the surface of a golf ball 1000. Thus, letter 1010 may include a subtle pattern on golf ball 1000 that may be seen from certain angles. The visibility of the pattern may be similar to that of a watermark and may be enhanced by coatings. For example, a coating material having a glossy appearance or sparkling particles may enhance the visibility of the pattern. In some embodiments, a coating material having self-organizing particles may be applied to the cover layer of golf ball 1000. In some embodiments, the coating material may include a clear top coat.

Any of the disclosed patterns may be combined with other patterns. For example, in some embodiments, a mold chamber surface may include a combination of four different patterns.

In some embodiments, the coating applied to the outer surface of the golf ball may range from about 8 microns to about 20 microns. In some embodiments, the coating applied to the outer surface of the golf ball may range from about 12 microns to about 15 microns.

In an exemplary embodiment, a method of making a golf ball mold may include a step 1202 including machining at least two mold chambers each having a shape that is the inverse of a substantially hemispherical shape. For example, the mold chambers may appear generally like mold chamber 410 shown in FIG. 4. It is understood that current machining technology does not yield perfect inverse hemispherical shapes. Thus, the inverse hemispherical shape of the mold chambers may be formed within standard manufacturing tolerances. In some embodiments, step 1202 may include machining protrusions corresponding to dimples on the mold chamber. For example, the protrusions may appear generally like protrusions 412 shown in FIG. 4. The plurality of protrusions may generally be arranged so that the dimples form on the cover layer in any pattern, as may be known in the art of golf balls. Various known dimple packing patterns are known in the art. Dimples may generally be of any shape, such as circular, triangular, or multi-sided. Dimples may be of uniform shape and size, or the dimple pattern may be made up of two or more different types of dimples having, for example, different sizes or different shapes. In some embodiments, step 1202 may include machining gates and/or ports around the mold chamber. For example, the ports and/or gates may appear generally like ports 414 and/or gates 416 shown in FIG. 4. In some embodiments, the mold may include more than two mold portions. For example, each of the mold halves may include two separate portions such that the mold includes a total of four mold portions. In some embodiments, step 1202 may be completed by a 5-axis machine. In some embodiments, the 5-axis machine may include a computer configured to control the movements of the components of the 5-axis machine. For example, the 5-axis machine may include a computer numerical controller. In some embodiments, the 5-axis machine may include a cutting device. For example, the cutting device may be a mechanical tool, such as a milling tool, or a laser. In some embodiments, step 1202 may be completed by a machine other than a 5-axis machine. For example, a vertical or horizontal mill may be used to complete step 1202.

In some embodiments, step 1204 may include machining a pattern of feed marks on the surface of the mold chamber. Step 1204 may include selecting the pattern of feed marks. For example, the user may select the pattern of feed marks from a group of feed marks. The user may select the pattern via an interface in communication with a computer numerical controller configured to control the movement of a cutting device of a machine. A path for the cutting device of a machine may be selected to leave behind feed marks in a desired pattern. For example, the cutting device may leave behind the patterns shown in FIGS. 4-9. In some embodiments, the paths described above with respect to FIGS. 4-9 may be followed by a cutting device of a machine. In some embodiments, the cutting device may be a mechanical tool. In some embodiments, the cutting device may be a laser. In some embodiments, step 1204 may be completed by a machine other than a 5-axis machine. For example, a vertical or horizontal mill may be used to complete step 1204. In some embodiments, the work piece is moved in place of or, in addition to, moving the tool or laser. In some embodiments, a computer numerical controller may select the path the tool or laser of a machine follows to leave behind feed marks.

In some embodiments, step 1202 and/or step 1204 may include manufacturing processes other than machining. For example, step 1202 and/or step 1204 may include stamping. Stamping may be performed according to the methods disclosed in U.S. Pat. No. 4,552,004 to Barfield et al. ("Barfield"), entitled "Apparatus for Forming Golf Ball Molds," issued on Nov. 12, 1985, the entirety of which is hereby incorporated by reference. Stamping may be performed according to the methods disclosed in U.S. Pat. No. 3,543,380 to Hagopian ("Hagopian"), entitled "Method of Making a Golf Ball Mold," issued on Dec. 1, 1970, the entirety of which is hereby incorporated by reference. In some embodiments, step 1202 and/or step 1204 may include the manufacturing process of hobbing. Hobbing may be performed according to the methods disclosed in U.S. Pat. No. 3,831,423 to Brown et al. ("Brown"), entitled "Method of Making Golf Ball Molds," issued on Aug. 27, 1974, the entirety of which is hereby incorporated by reference.

In some embodiments, step 1202 may include using one type of process or tool to form the general shape of the mold and step 1204 may include using another type of process or tool to texturize the surface of the mold by creating a pattern of feed marks. For example, step 1202 may include milling a blank into the inverse of a substantially hemispherical shape and step 1204 may include laser cutting the pattern of feed marks onto the surface of the milled mold. In another example, step 1202 may include milling a pattern of feed marks and/or dimples onto the surface of a hob and milling a blank into a mold chamber having the inverse of a substantially hemispherical shape and step 1204 may include using the hob to impress the pattern into the surface of the mold chamber. In another example, step 1204 may include die rolling or laser cutting a surface of a flat plate to texturize the surface of the plate by creating a pattern of feed marks and step 1202 may include stamping the texturized flat plate into the inverse of a substantially hemispherical shape. In such embodiments, the stamping process may slightly distort the pattern. Accordingly, this distortion may be taken into consideration when selecting the pattern. For example, in some embodiments, the pattern may be selected based upon how the pattern compensates for the distortion caused by the process of shaping the flat plate into the inverse of a substantially hemispherical shape. For example, the selected pattern may be smaller is regions that will be stretched during the shaping of the flat plate into the inverse of a substantially hemispherical shape. Known processes may be used to adjust a pattern to distort so that the pattern appears properly once it is stretched. For example, a pattern may be adjusted according to the methods disclosed in U.S. Pat. No. 5,165,965 to Martin ("Martin"), entitled "Method for Providing Predistorted Images on Shrinkable Film," issued on Nov. 24, 1992, the entirety of which is hereby incorporated by reference. This patent discloses a method of making dimensions of an image bigger before shrink wrapping the image onto a bottle. The larger dimensions compensate for the portions of the pattern that shrink during the shrink wrapping process. Similar to making dimensions of a pattern larger to compensate for shrinking, dimensions of the pattern may be made smaller to compensate for stretching.

In an exemplary embodiment, a method of making a golf ball may include a step 1302 including providing a golf ball mold made by steps 1202 and 1204. For example, the golf ball mold may include two complimentary mold halves each having hemispherical mold chambers. In some embodiments, each of the mold halves may include multiple mold chambers to mold multiple golf ball cover layers simultaneously. In some embodiments, a step 1304 may include forming a golf ball core. In some embodiments, a step 1306 may include placing a golf ball core between the two complimentary mold halves. In some embodiments, step 1306 may include placing multiple golf ball cores between the two complimentary mold halves. In some embodiments, a step 1308 may include pressing the two mold halves together to enclose the mold chambers around the golf ball core(s). In some embodiments, a step 1310 may include injecting golf ball cover layer material in the mold chambers. In some embodiments, step 1310 may include injecting golf ball cover layer material into the ports of mold chambers. In some embodiments, step 1310 may include injecting golf ball cover layer material into the gates of mold chambers. In some embodiments, step 1310 may include injecting golf ball cover layer material into the gates and ports of mold chambers. In some embodiments, the golf ball cover layer material may include a polymer, such as a thermoplastic, elastomeric, or thermosetting material.

In some embodiments, a step 1312 may include removing the molded golf ball from the golf ball mold. In some embodiments, a step 1314 may include removing excess golf ball cover layer material from the golf ball. For example, the golf ball may include a ring and rods caused by golf ball cover material left in the gates during the molding process. In some embodiments, a step 1316 may include finishing work. For example, step 1316 may include applying a substantially liquid coating material to the surface of the cover layer.

It is understood that any of the steps disclosed above may be performed in any order. For example, step 1202 may be performed at the same time as step 1204 such that the pattern of feed marks is developed as the general shape of the mold chamber is being machined.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making a golf ball comprising:
 selecting a pattern of feed marks to be formed on the surface of a golf ball mold, wherein the step of selecting the pattern of feed marks is performed by a user;
 machining the selected pattern of feed marks on the surface of the golf ball mold;
 placing a core within the golf ball mold;
 injecting golf ball cover material into the golf ball mold to form a cover layer;
 wherein the selected pattern of feed marks is formed into the cover layer; and
 wherein the pattern is configured to create capillary action on the surface of the cover layer to substantially counteract gravity and/or other forces acting on a substantially liquid coating material applied to the cover layer.

2. The method according to claim 1, wherein the selected pattern includes a first set of rows of substantially parallel feed marks and a second set of rows of substantially parallel feed marks intersecting the first set of rows.

3. The method according to claim 2, wherein the first set of rows includes substantially parallel rows and the second set of rows includes substantially parallel rows.

4. The method according to claim 3, wherein the first set of rows is substantially perpendicular to the second set of rows.

5. The method according to claim 1, wherein the selected pattern includes a set of feed marks forming a spiral pattern.

6. A method of making a golf ball mold comprising:
 selecting a pattern of feed marks to be formed on the surface of a golf ball mold, wherein the step of selecting the pattern of feed marks is performed by a user;
 selecting a path for a cutting device to follow to form the selected pattern of feed marks;
 forming the selected pattern of feed marks on the surface of the golf ball mold such that the selected pattern of feed marks is formed on a surface of cover layer of a golf ball that is formed through the use of the mold; and
 wherein the pattern is configured to create capillary action on the surface of the cover layer to substantially counteract gravity and/or other forces acting on a substantially liquid coating material applied to the cover layer.

7. The method according to claim 6, wherein the cutting device includes a milling tool.

8. The method according to claim 6, wherein the cutting device includes a laser cutter.

9. The method according to claim 6, wherein the selected pattern of feed marks includes a pattern of perpendicular sets of rows.

10. The method according to claim 6, wherein the step of selecting a path for the cutting device to follow is performed by a computer.

11. The method according to claim 10, wherein the step of forming the selected pattern includes moving the cutting tool in the selected path.

12. A method of making a golf ball mold comprising:
 machining at least two mold chambers each having a shape that is the inverse of a substantially hemispherical shape;
 machining protrusions on a surface of the two mold chambers;
 machining a pattern of feed marks on the surface of the mold chamber such that the selected pattern of feed marks is formed on a surface of cover layer of a golf ball that is formed through the use of the mold, wherein the pattern is configured to create capillary action on the surface of the cover layer to substantially counteract gravity and/or other forces acting on a substantially liquid coating material applied to the cover layer.

13. The method of making a golf ball mold according to claim 12, wherein the pattern includes a first set of rows of substantially parallel feed marks and a second set of rows of substantially parallel feed marks intersecting the first set of rows.

14. The method of making a golf ball mold according to claim 13, wherein the first set of rows includes substantially parallel rows and the second set of rows includes substantially parallel rows.

15. The method of making a golf ball mold according to claim 14, wherein the first set of rows is substantially perpendicular to the second set of rows.

16. The method of making a golf ball mold according to claim 15, wherein the pattern includes a set of feed marks forming a spiral pattern.

17. A method of making a golf ball comprising:
 providing a golf ball mold including at least two mold chambers each including a mold surface having a shape that is the inverse of a substantially hemispherical shape, each of the mold surfaces having protrusions and feed marks forming a pattern configured to create capillary action to substantially counteract gravity and/or other forces acting on a substantially liquid coating material applied to the cover layer of a golf ball formed by the golf ball mold;

forming a golf ball core;

placing the golf ball core between the at least two mold chambers;

pressing the at least two mold chambers together;

injecting a golf ball cover material into the mold chambers to form a cover layer; and wherein the selected pattern of feed marks is formed into the cover layer.

18. The method of making a golf ball according to claim 17, wherein injecting a golf ball cover material into the mold chambers includes injecting the golf ball cover material into ports and gates of the golf ball mold.

19. The method of making a golf ball according to claim 17, wherein the pattern of feed marks includes a first set of rows of substantially parallel feed marks and a second set of rows of substantially parallel feed marks intersecting the first set of rows.

20. The method of making a golf ball according to claim 17, wherein the pattern includes a set of feed marks forming a spiral pattern.

* * * * *